(12) United States Patent
Henry

(10) Patent No.: US 9,332,215 B1
(45) Date of Patent: May 3, 2016

(54) SYSTEM AND METHOD FOR DISPLAYING TO AIRBORNE PERSONNEL MISSION CRITICAL HIGH DYNAMIC RANGE VIDEO ON A LOW RESOLUTION DISPLAY

(71) Applicant: Daniel J. Henry, Cedar Rapids, IA (US)

(72) Inventor: Daniel J. Henry, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 559 days.

(21) Appl. No.: 13/747,636

(22) Filed: Jan. 23, 2013

(51) Int. Cl.
*H04N 7/01* (2006.01)
*H04N 21/234* (2011.01)
*H04N 1/393* (2006.01)
*H04N 21/2343* (2011.01)

(52) U.S. Cl.
CPC .............. *H04N 7/0122* (2013.01); *H04N 1/393* (2013.01); *H04N 21/234* (2013.01); *H04N 21/2343* (2013.01); *H04N 21/234363* (2013.01)

(58) Field of Classification Search
CPC ............................ H04N 7/005; H04N 7/0122
See application file for complete search history.

(56) References Cited

U.S. PATENT DOCUMENTS

| | | | |
|---|---|---|---|
| 2008/0129763 A1* | 6/2008 | Awakura et al. | 345/690 |
| 2013/0063341 A1* | 3/2013 | Hirata | 345/156 |
| 2014/0210847 A1* | 7/2014 | Knibbeler et al. | 345/589 |

* cited by examiner

*Primary Examiner* — Jefferey Harold
*Assistant Examiner* — Justin Sanders
(74) *Attorney, Agent, or Firm* — Simmons Perrine Moyer Bergman PLC

(57) ABSTRACT

A method and system for displaying to a pilot, or other airborne personnel, high resolution video signal content on a lower resolution display, by providing a plurality of pilot selectable aspects of the high resolution video signals, which are predetermined to accentuate a particular characteristic of said high resolution video signals, where the aspects are non-linear mappings of the high resolution signals (x) to (y) on said lower resolution display, where the non-linear mapping has y determined by a constant with an exponent which includes x and a logarithmic constant.

18 Claims, 18 Drawing Sheets

SYSTEM AND METHOD FOR DISPLAYING TO AIRBORNE PERSONNEL MISSION CRITICAL HIGH DYNAMIC RANGE VIDEO ON A LOW RESOLUTION DISPLAY

BACKGROUND OF THE INVENTION

The present invention relates to avionics and military displays and, more generally, relates to such displays which receive data from sensors having a relatively higher dynamic range.

High-performance imaging sensors typically have dynamic ranges greater than 8 bits/pixel; however, many displays limit displayable dynamic range to 8 bits/pixel.

As a result, to maintain the dynamic range advantage of these high-performance sensors, efforts have been made to find a way to effectively display the high-dynamic range of the sensor on a lower dynamic range display.

Dynamic Range vs. Bits (in dB)
8 bits is 48.2 dB.
9 bits is 54.2 dB.
10 bits is 60.2 dB.

In the past, the output of high-dynamic range video camera sensors have been mapped to lower-dynamic range displays using an assortment of look-up tables with differing mapping functions, where non-linear functions utilized have been known as the gamma function where the mapping relationship is X raised to the power of gamma. i.e., the X (the sensor output value to be mapped to the display) is the base numeral. While the linear and the gamma functions have been well known in the art for many years, they have some drawbacks.

A single aspect linear mapping approach will, by design, result in a loss in image dynamic range across the entire display, thereby eliminating some of the benefits of a higher dynamic range imaging sensor. The gamma function can be problematic in that either it often is too similar to the linear mapping approach with its concomitant problems, or it is prone to saturation where dynamic range is not degraded, but entirely lost.

Also in the past, it has been known to provide pilots or airborne refueling personnel, who are provided with a live video image, with a mere brightness adjustable display which allows an adjustability of the brightness of the incoming video image. In such displays, the mapping scheme is not believed to be altered other than a gain increase or decrease of brightness on every pixel.

Consequently, there exists a need for a system for airborne personnel to be able to view and have the ability to benefit from live, high-dynamic range video images on a low-dynamic range display.

SUMMARY OF THE INVENTION

It is an object of the present invention to provide systems and methods for improved image display of high-dynamic range data.

It is a feature of the present invention to include a pilot-selectable mapping scheme with a plurality of sensor data mapping mode choices.

It is an advantage of the present invention to better manage data being displayed, so as to give a high-dynamic range image in certain brightness ranges and lower, but not zero, in other ranges.

It is another feature of the present invention to include a plurality of selection mapping exponential functions, where the sensor output value X is not utilized in the base of the mapping function (as in the gamma function), but instead in the exponent.

It is another advantage of the present invention to provide for the use of a relatively small number of alternate selectable modes, which provide, in combination, a wide range of displayed dynamic ranges to span the dynamic range of input values.

It is yet another advantage of the present invention to utilize a Logarithmic—Exponential (Log-Exp) mapping function, which provides a Dynamic Range Multiplier, which out performs the gamma function.

The present invention is a method and apparatus for displaying high-dynamic range image sensing data to lower-dynamic range displays, which is designed to satisfy the aforementioned needs, provide the previously stated objectives, include the above-listed features, and achieve the already articulated advantages.

Accordingly, the present invention is a method and apparatus providing a plurality of selectable Log-Exp non-linear mapping function modes.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
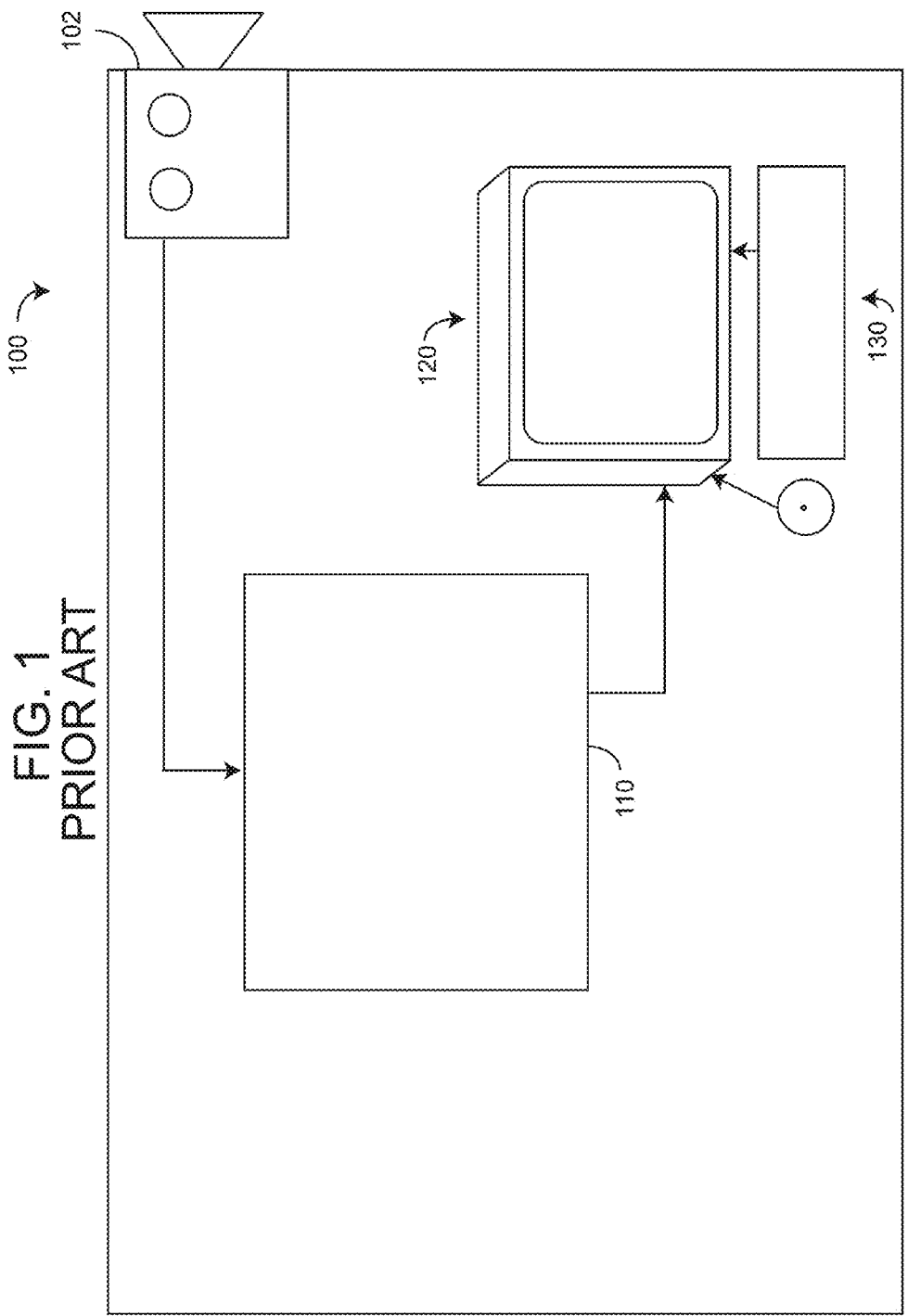
FIG. 1 is a simplified diagram of a pilot-adjustable video display of the prior art.

Now referring to the drawings, wherein like numerals refer to like matter throughout, and more particularly to FIG. 1, there is shown a simplified view of an airborne-video capture and live-display system, generally designated 100 of the prior art; which included a video camera 102, a video display 120, a video display controller 130 (keyboard, mouse, joystick, etc.) and a processor 110. A system similar to this has been utilized on reconnaissance and surveillance aircraft.

Figure 2:
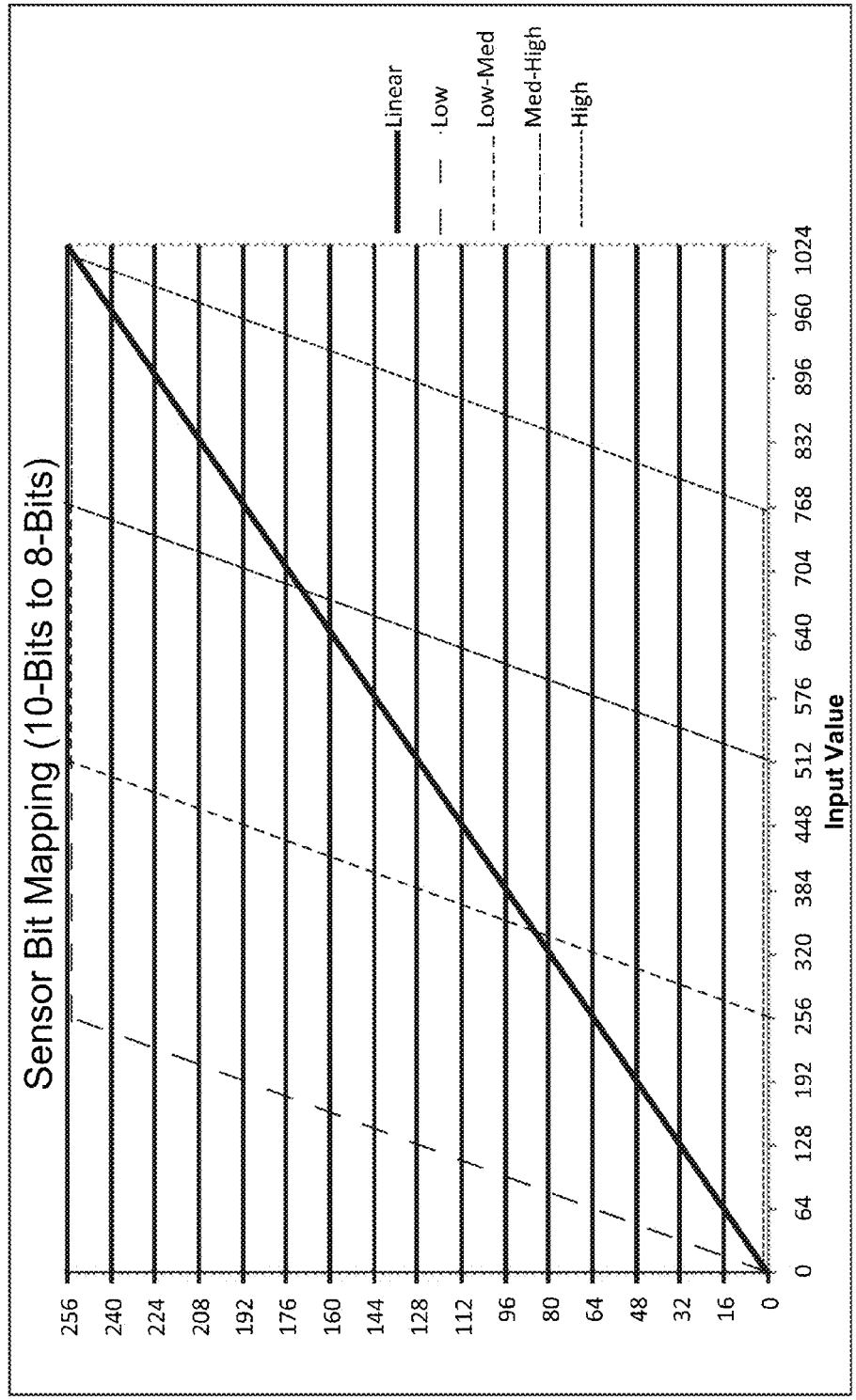
FIG. 2 is a representation of a prior art linear mapping with a pilot-movable window represented by 4 non-overlapping regions.

One embodiment of the present invention is a system which allows the airborne personnel to select among four different aspects of the 10 bit data to be mapped to the 8 bit display. Each of these aspects will have a limited range, but will provide full image resolution within its limited range of input values, but each aspect will not provide any information outside of the limited range. The pilot or other airborne personnel is enabled to select between four detailed aspects of interest, or a fifth aspect that spans the entire range but with lower-dynamic range. In a linear-mapping embodiment of the present invention, the 8 bit display is limited to 256 pixel variations, but the incoming 10 bit data has 1024 pixel variations. FIG. 2 shows a pilot-movable 8 bit window represented by four non-overlapping regions (or in another embodiment by a continuously movable window), which are four non overlapping regions shown by four parallel lines, one for each of 8 bit aspects of a portion of the 1024 possible input variations.

Figure 3:
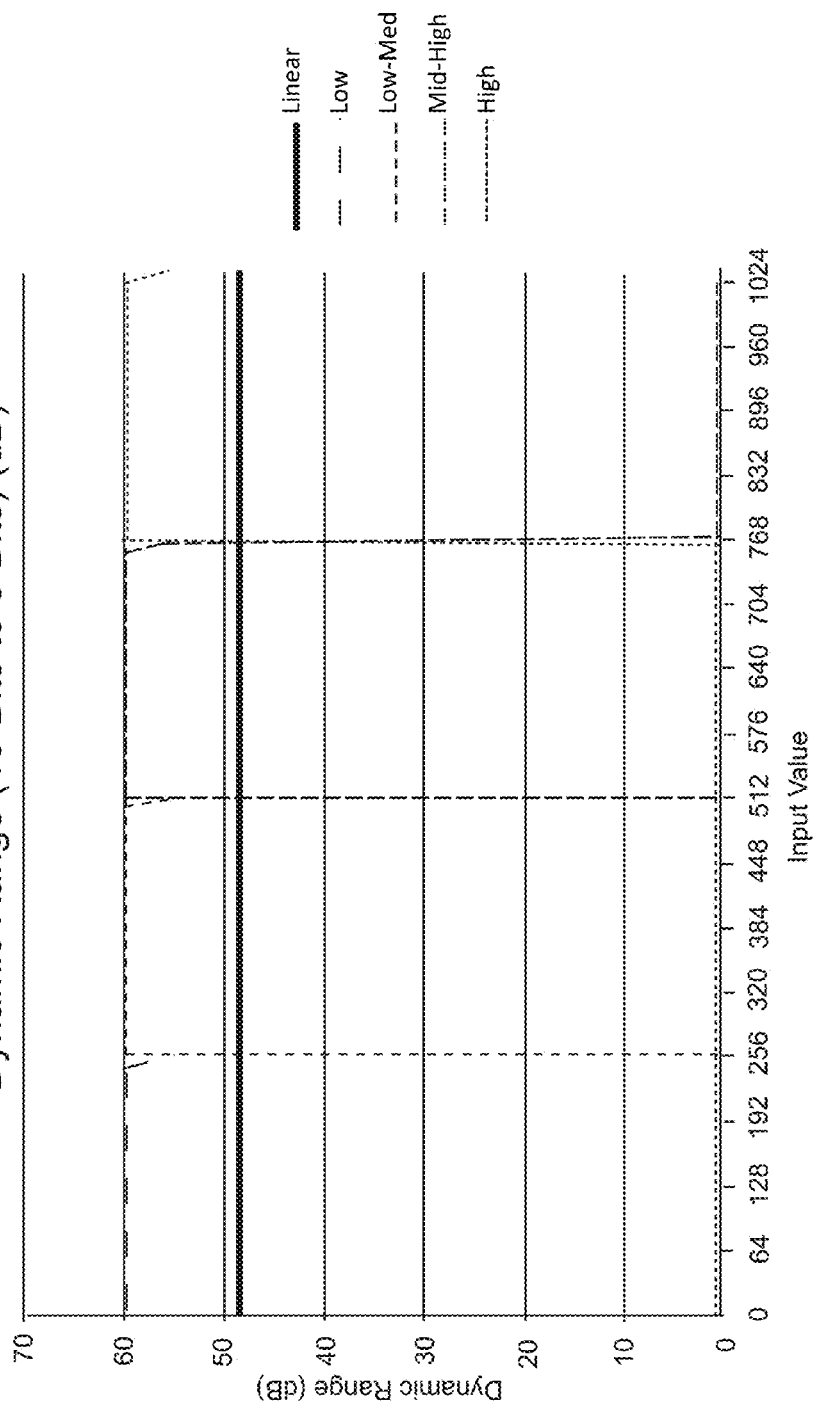
FIG. 3 is a chart of the dynamic range for each of the four aspects of FIG. 2.

Now referring to FIG. 3, there is shown a chart of the dynamic range for each of the four aspects, and one for the single linearly-mapped 10-bit to 8-bit aspect. The dynamic range is 60 db inside of each of these aspects, or windows, and 0 db elsewhere.

Figure 4:
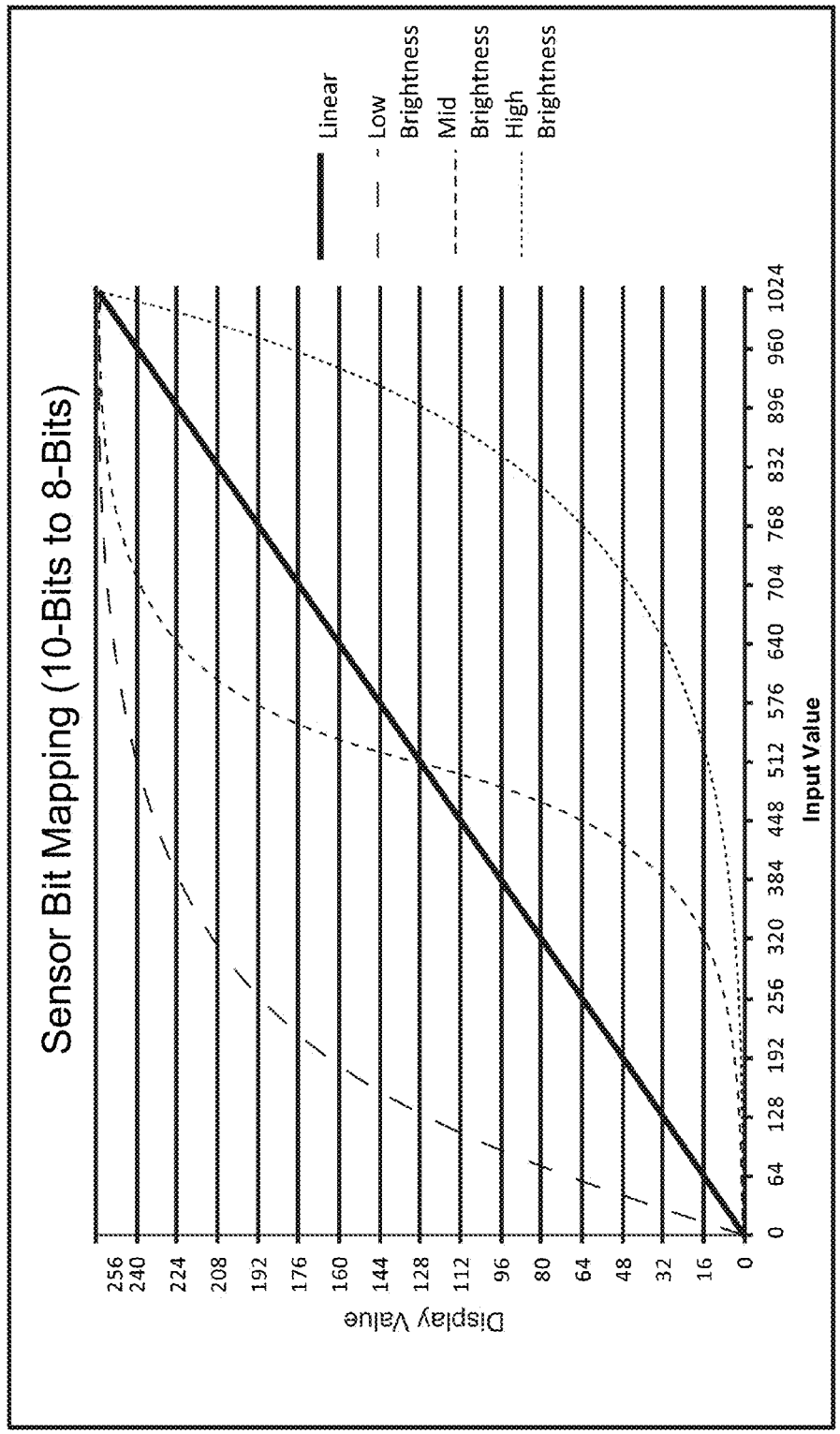
FIG. 4 is a non-linear mapping graph of the method of the present invention.

Now referring to FIG. 4, there is shown a 10-Bit to 8-Bit non-linear Log-Exponential mapping graph, with three aspects, each of which accentuates different data input regions of interest, but still allows at least some mapping of data outside of the input region of interest, without clipping or saturation in any region of the input values.

Figure 5:
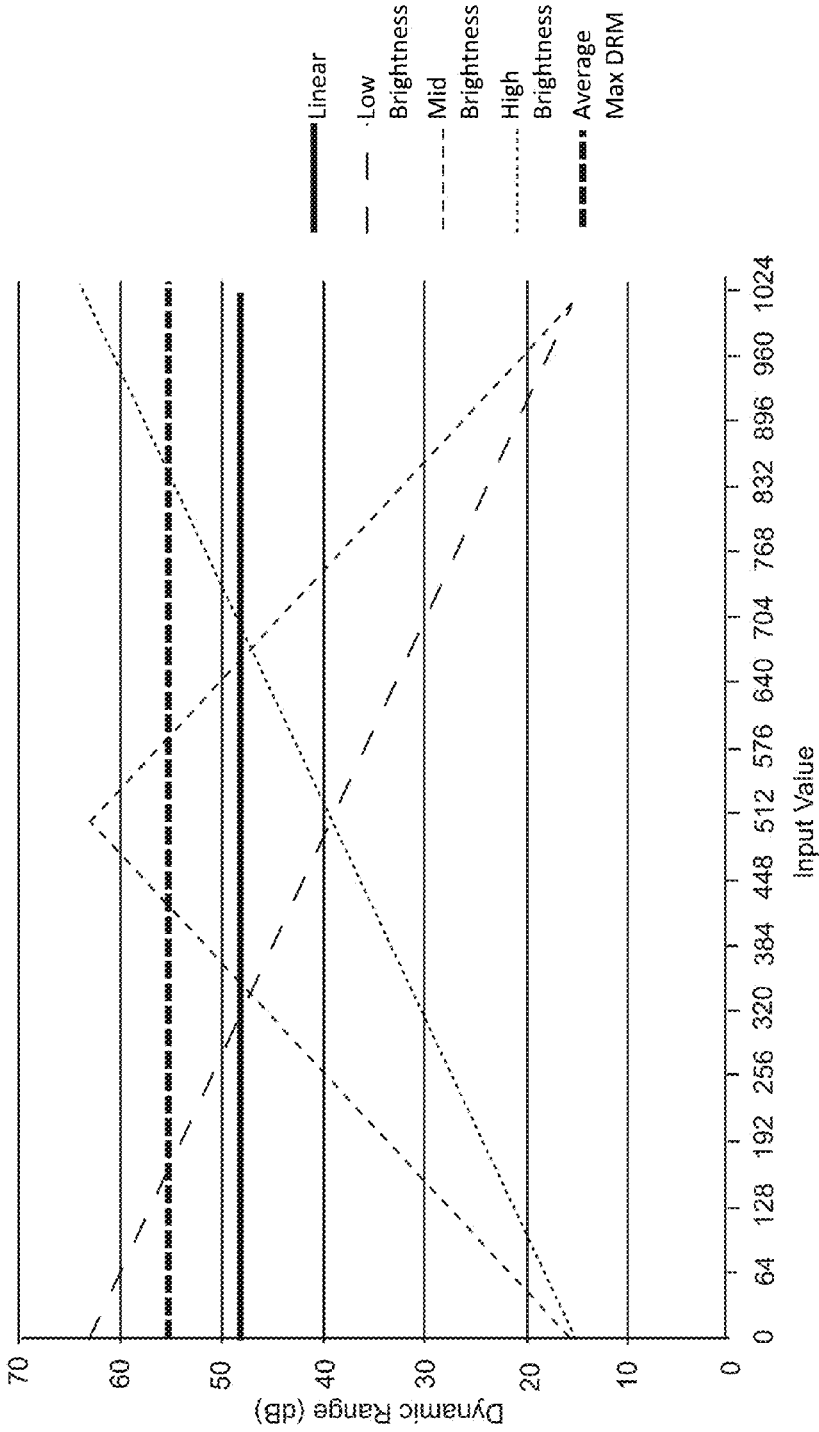
FIG. 5 is a dynamic-range graph of the dynamic range of each line in FIG. 4.

Now referring to FIG. 5, there is shown a dynamic-range graph of each line in FIG. 4. Also shown, is the average maximum dynamic range of the three non-linear mapped aspects, which is clearly higher than the single linearly mapped aspect.

Figure 6:
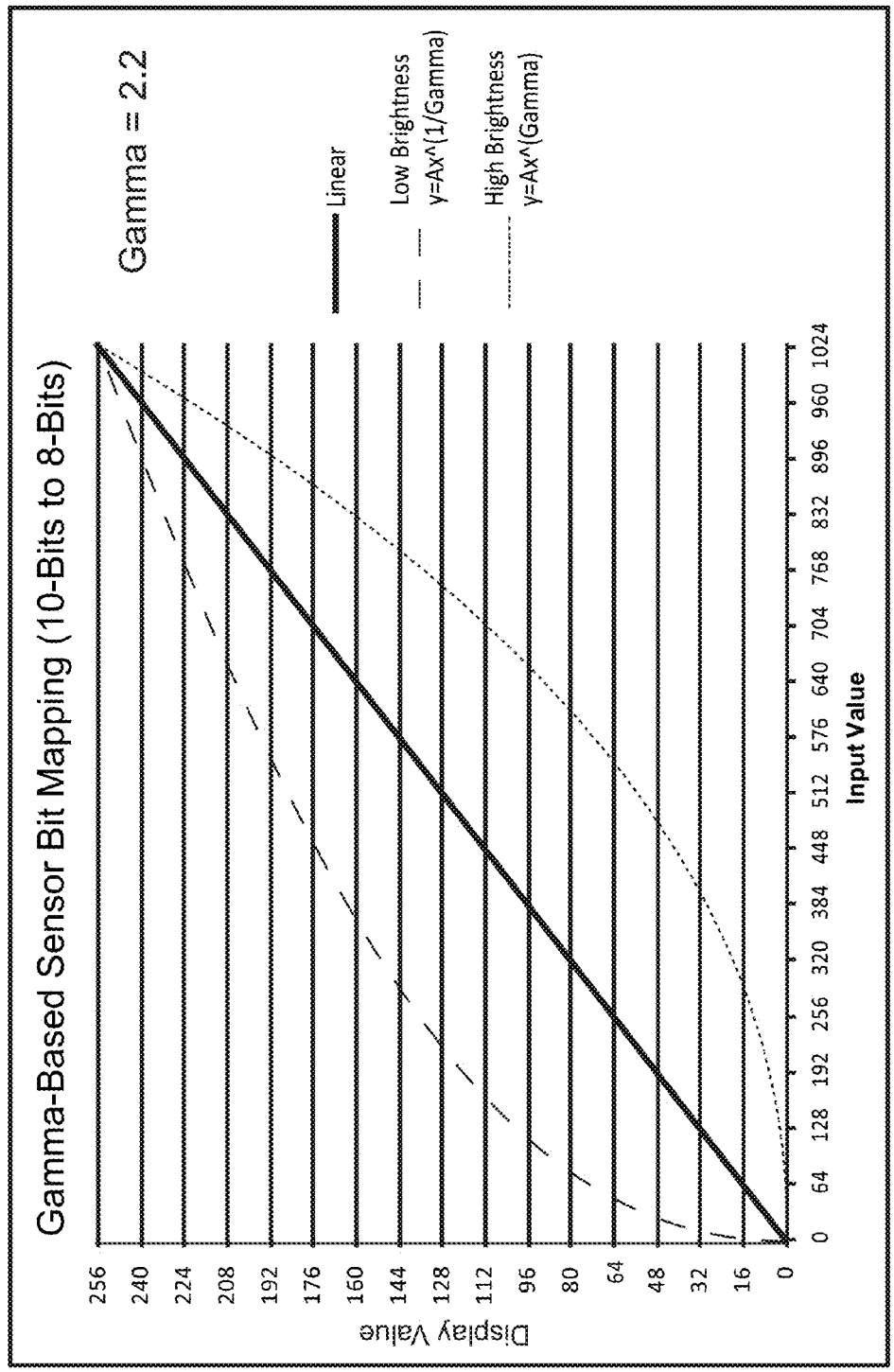
FIG. 6 is a schematic diagram of a prior art gamma-function graph with gamma equal to 2.2.

Now referring to FIG. 6, there is shown a gamma (γ) based sensor bit mapping (10-Bits to 8-Bits) graph, where the dashed line is the mode to be selected for viewing low brightness input where $y=Ax^{1/\gamma}$ and where the dashed line is the mode selected to be used for viewing high brightness input where $y=Ax^{\gamma}$. The solid line is the comparison line for a linear mapping. Gamma is set at 2.2.

Figure 7:
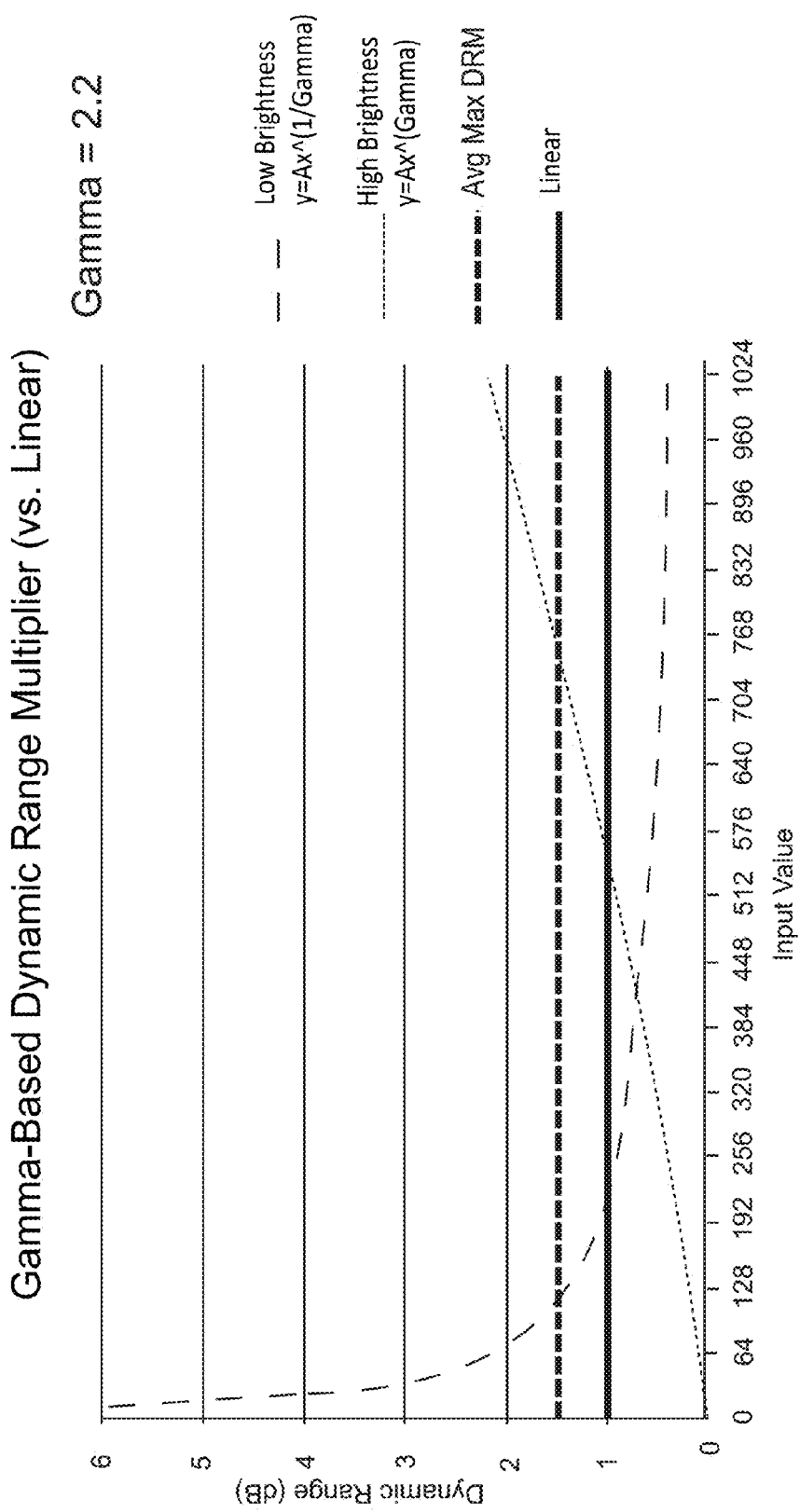
FIG. 7 is a gamma based dynamic-range multiplier comparison to linear graph for gamma equal to 2.2

Now referring to FIG. 7, there is a dynamic-range multiplier (DRM) comparison graph to compare the dynamic range for gamma and 1/gamma to the dynamic range of a single linear mapped aspect of FIG. 6, where the fine dotted line is the DRM for the fine dotted line of FIG. 6, and the fine dashed line is the DRM from the fine dashed line of FIG. 6. The solid line at 1 represents the DRM (unity) of the linear mapping, and the solid line at 1.54 is the line for the average max DRM. As shown in FIG. 7, the low brightness dynamic range performance exceeds the linear dynamic range by the DRM. For low brightness inputs, the low brightness DRM>1, which means that the dynamic range is higher than the linear case; however, at higher brightness inputs, the low brightness DRM<1, which means that the dynamic range is out-performed by the linear case. Likewise, the high brightness dynamic range outperforms the linear case at high input values, but is out-performed by the linear case for low input values. The average max DRM, depicted by the thick dashed line in FIG. 7, shows that the low brightness curve is used for low input values and the high brightness curve is used for higher values. The average DRM over the entire range outperforms the Linear case by 1.52:1.

Figure 8:
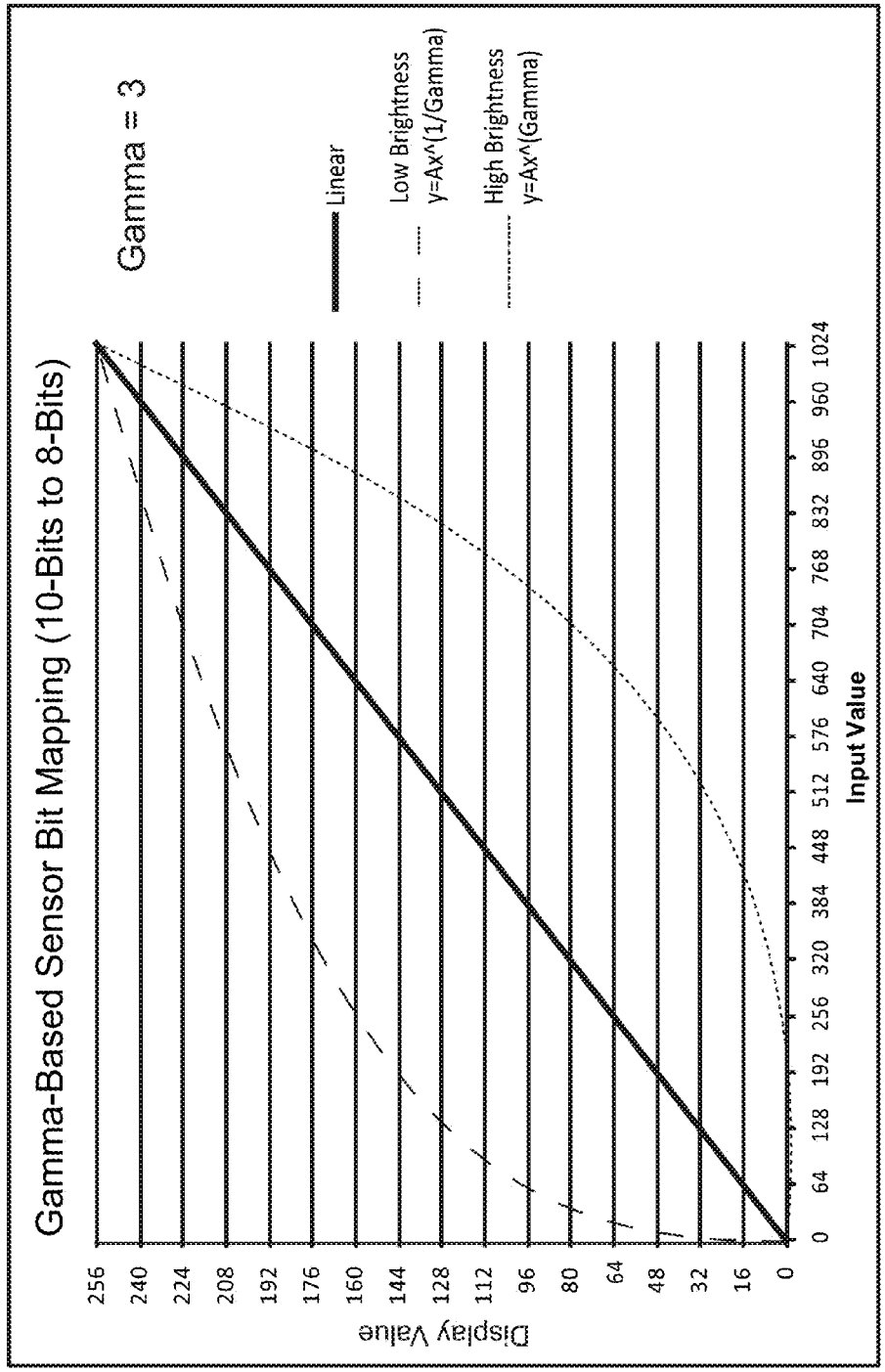
FIG. 8 is a schematic diagram of a prior art gamma-function graph with gamma equal to 3.0.

Now referring to FIG. 8, there is shown a gamma based sensor bit mapping (10-Bits to 8-Bits) graph, where the dashed line is the mode to be selected for viewing low brightness input where $y=Ax^{1/\gamma}$ and where the dashed line is the mode selected to be used for viewing high brightness input where $y=Ax^{\gamma}$. The solid line is the comparison line for a linear mapping. Gamma is set at 3.0.

Figure 9:
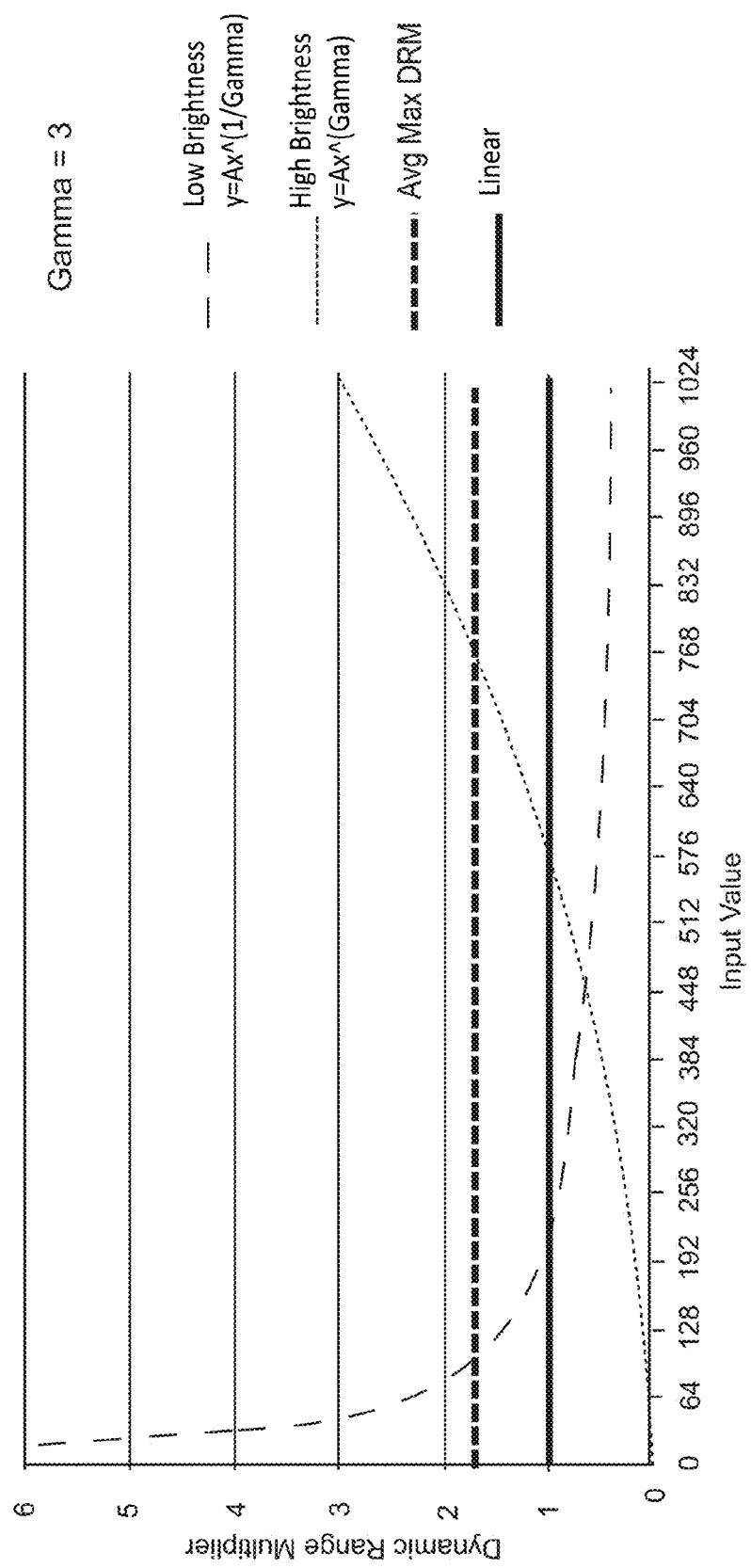
FIG. 9 is a gamma based dynamic-range multiplier comparison to linear graph for gamma equal to 3.0

Now referring to FIG. 9, there is a dynamic range multiplier comparison graph to compare the gamma of FIG. 8 to a linear mapping where the dotted line is the DRM from the dotted line of FIG. 8, and the dashed line is the DRM from the dashed line of FIG. 8. The solid line at 1 represents the DRM (unity) of the linear mapping and the solid line at 1.68 is the line for the average max dynamic range.

Figure 10:
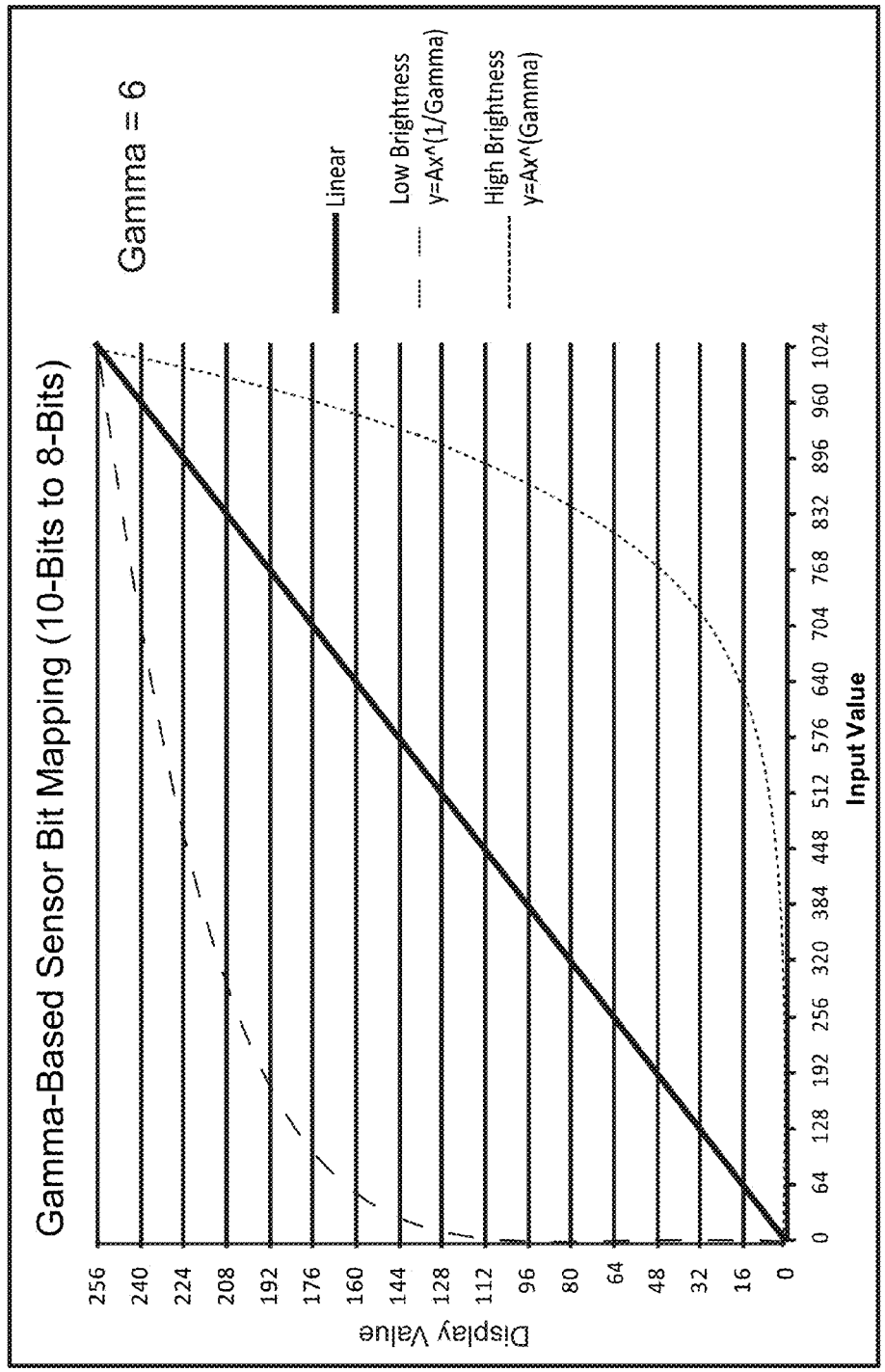
FIG. 10 is a schematic diagram of a prior art gamma-function graph with gamma equal to 6.0.

Now referring to FIG. 10, there is shown a gamma based sensor bit mapping (10-Bits to 8-Bits) graph, where the dashed line is the mode to be selected for viewing low brightness input where $y=Ax^{1/\gamma}$ and where the dashed line is the mode selected to be used for viewing high brightness input where $y=Ax^{\gamma}$. The solid line is the comparison line for a linear mapping. Gamma is set at 6.0.

Figure 11:
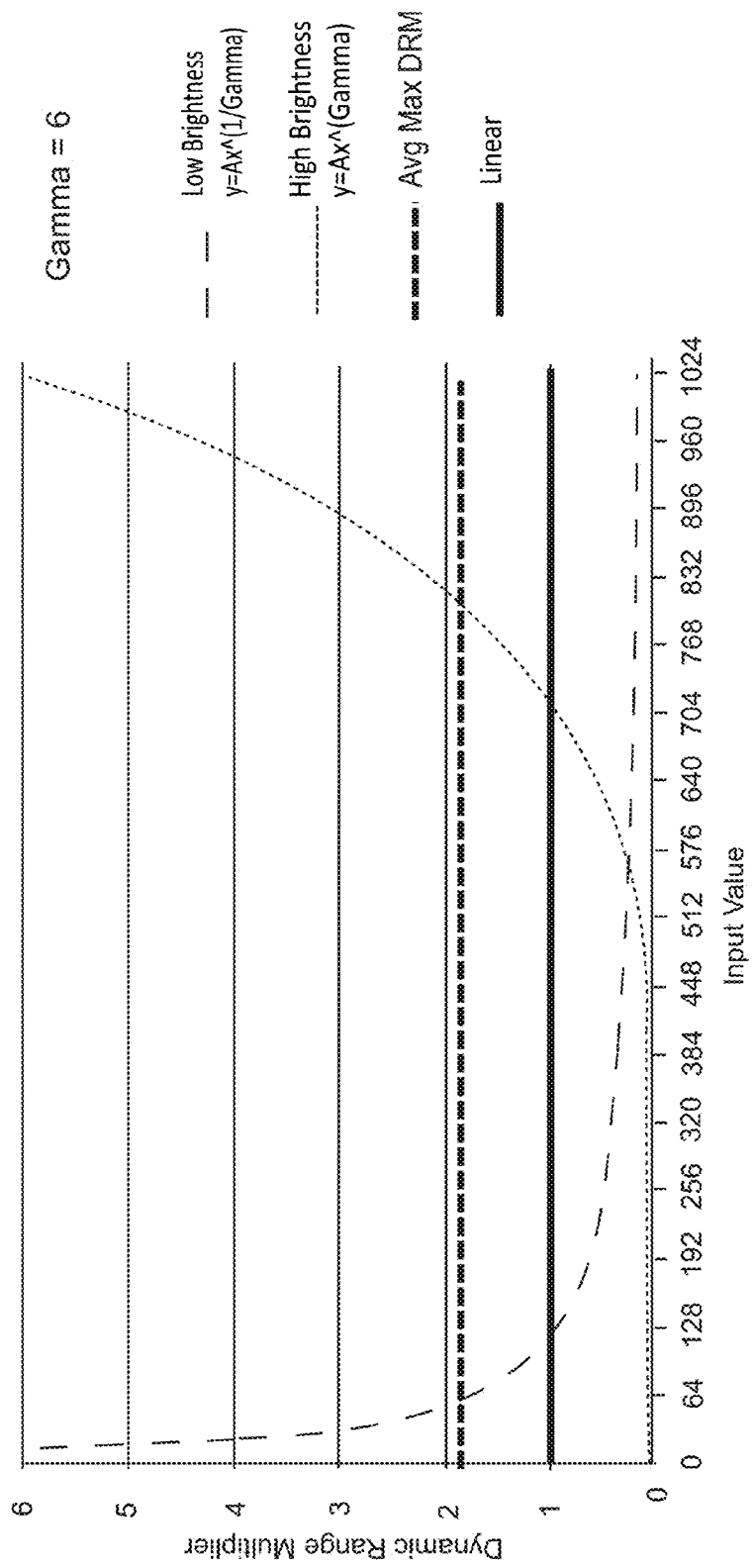
FIG. 11 is a gamma based dynamic-range multiplier comparison to linear graph for gamma equal to 6.0.

Now referring to FIG. 11, there is a dynamic range multiplier comparison graph to compare the Gamma of FIG. 10 to a linear mapping, where the dotted line is the DRM from the dotted line of FIG. 10, and the dashed line is the DRM from the dashed line of FIG. 10. The solid line at 1 represents the DRM (unity) of the linear mapping and the solid line at 1.88 is the line for the average max dynamic range.

Figure 12:
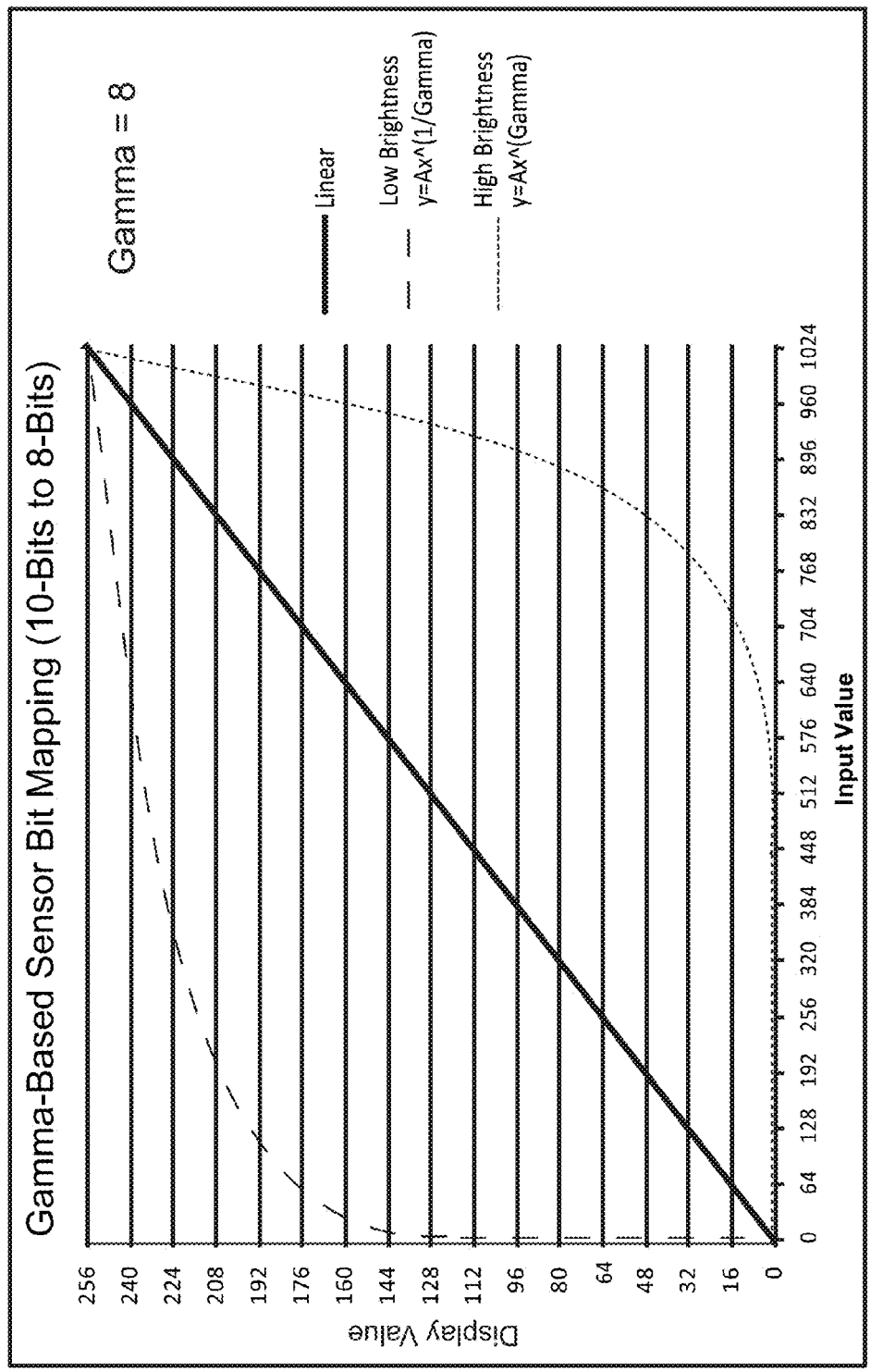
FIG. 12 is a schematic diagram of a prior art gamma-function graph with gamma equal to 8.0.

Now referring to FIG. 12, there is shown a gamma based sensor bit mapping (10-Bits to 8-Bits) graph, where the dashed line is the mode to be selected for viewing low brightness input where $y=Ax^{1/\gamma}$ and where the dashed line is the mode selected to be used for viewing high brightness input where $y=Ax^{\gamma}$. The solid line is the comparison line for a linear mapping. Gamma is set at 8.0.

Figure 13:
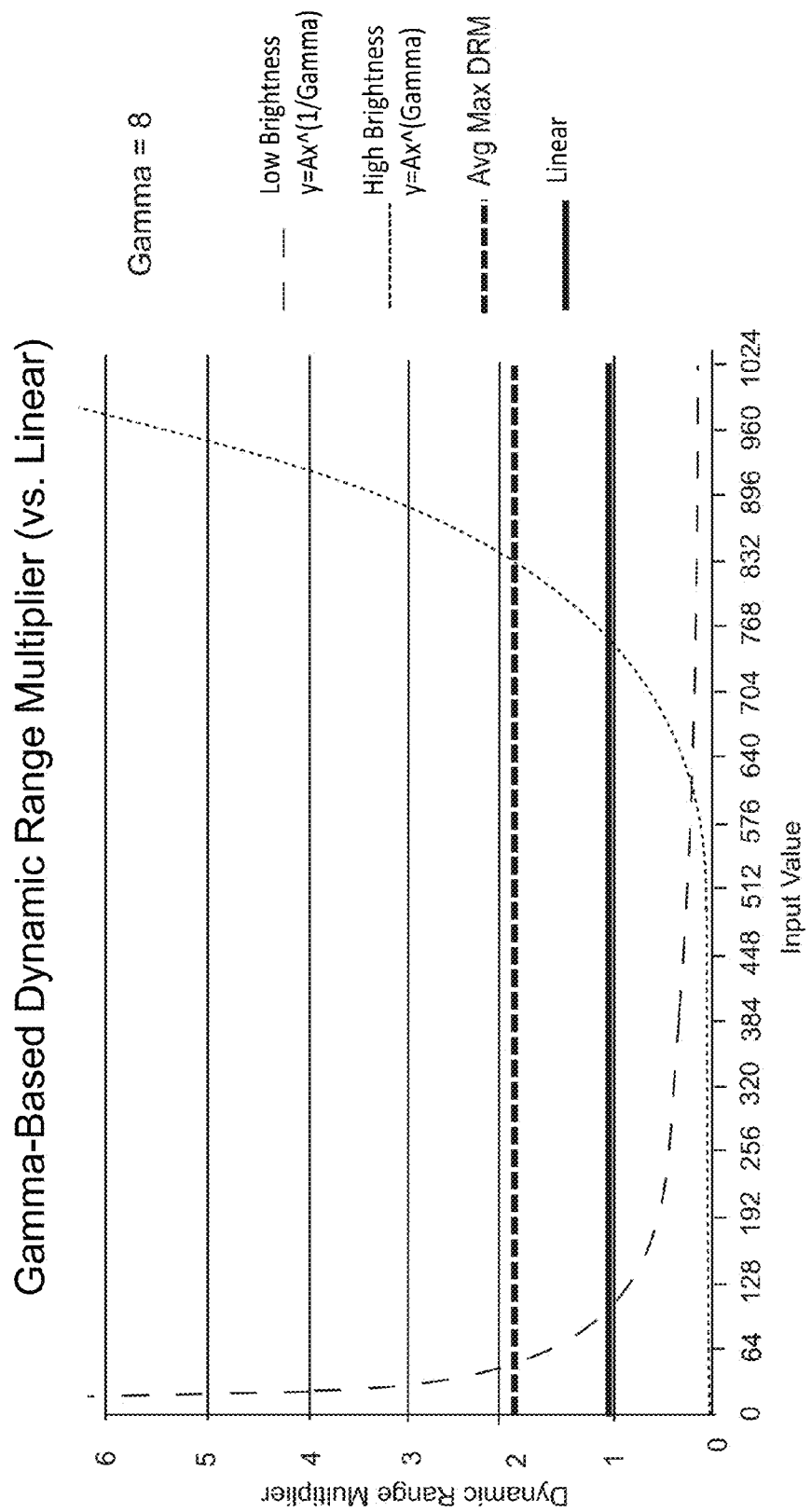
FIG. 13 is a gamma based dynamic-range multiplier comparison to linear graph for gamma equal to 8.0.

Now referring to FIG. 13, there is a dynamic range multiplier comparison graph to compare the gamma of FIG. 12 to a linear mapping, where the dotted line is the DRM from the dotted line of FIG. 12 and the dashed line is the DRM from the dashed line of FIG. 12. The solid line at 1 represents the DRM (unity) of the linear mapping and the solid line at 1.92 is the line for the average max dynamic range.

Figure 14:
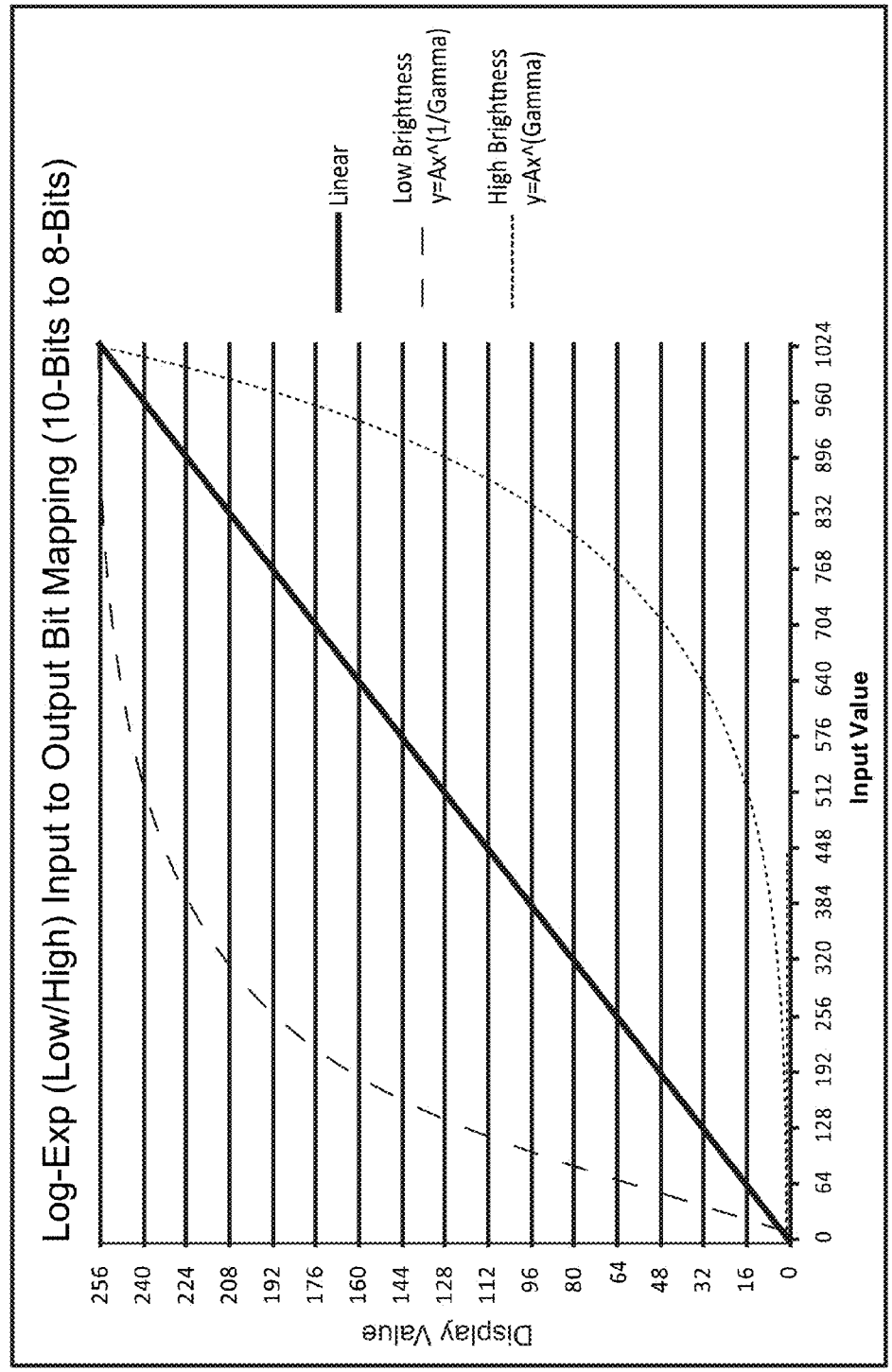
FIG. 14 is a schematic diagram of a dual-mapping mode (high and low) Log-Exp function graph of the present invention.

Now referring to FIG. 14, there is shown a Log-Exponential mapping chart of the dual mapping mode process of the present invention.

The low brightness or dotted line is a graph of the following function:

$$Y=2^{\wedge}(N_y)*(1-10^{\wedge}(-ax))$$

And the high brightness or dashed line is a graph of the following function:

$$Y=10^{\wedge}(ax)-1$$

Where:
$a=(\log_{10}(2^{\wedge}N_y))/(2^{\wedge}(N_x)-1)$
$N_x$=Number of bits in the Input (X-axis) [Max=$2^{\wedge}(N_x)-1$]
$N_y$=Number of bits in the Output (Y-axis) [Max=$2^{\wedge}(N_y)-1$]

Figure 15:
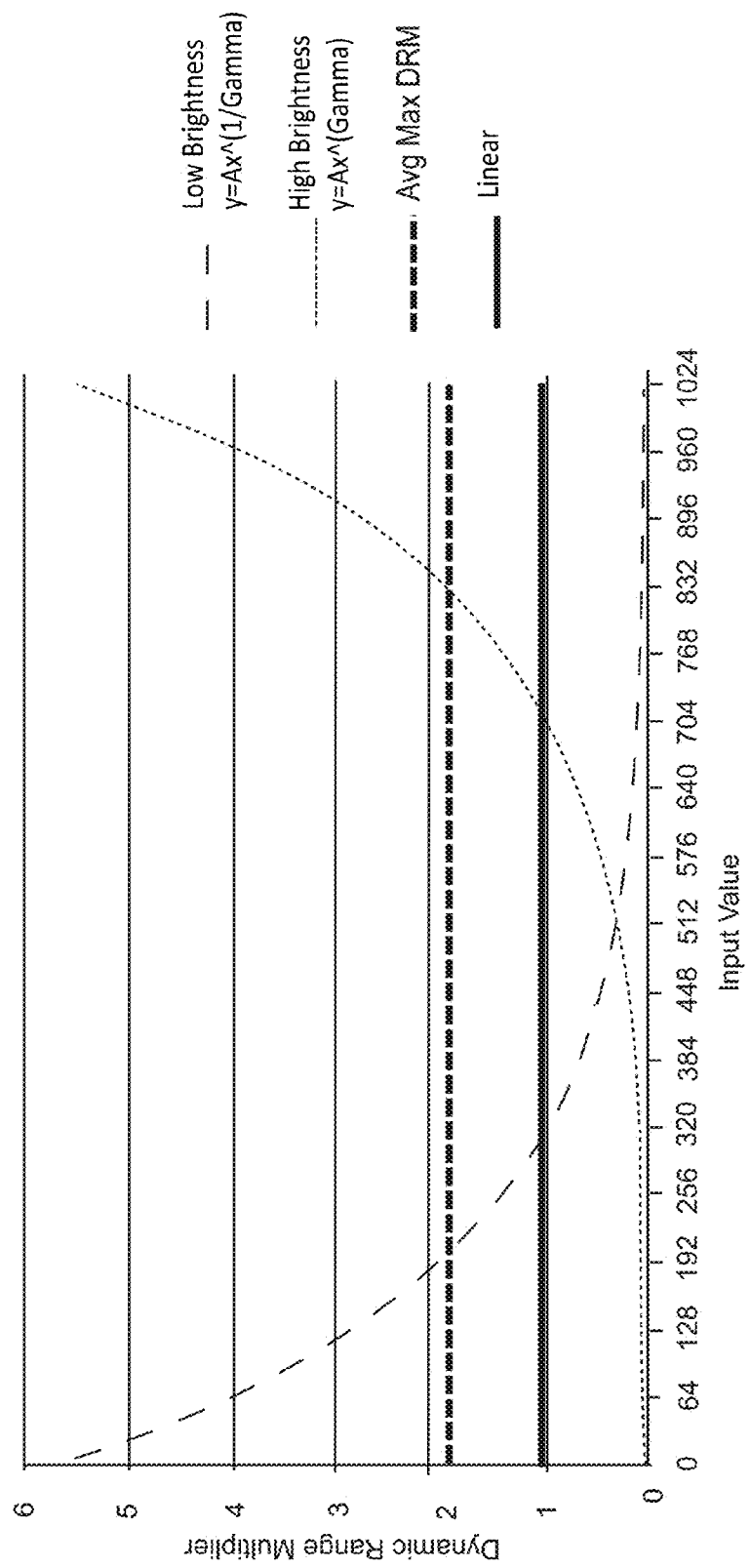
FIG. 15 is a Log-Exp based dynamic-range multiplier comparison to linear graph for the dual-mapping mode Log-Exp function of FIG. 10.

Now referring to FIG. 15, there is shown a dynamic range multiplier comparison graph (similar in format to FIGS. 7, 9, 11, and 13) to compare the dynamic range for Log-Exp bit mapping graphs to the dynamic range of a single linear mapped aspect of FIG. 14, where the dotted line is the DRM for the dotted line of FIG. 14, and the dashed line is the DRM for the dashed line of FIG. 14. The solid line at 1 represents the DRM (unity) of the linear mapping and the thick dashed line at 1.54 is the line for the average max dynamic range.

Figure 16:
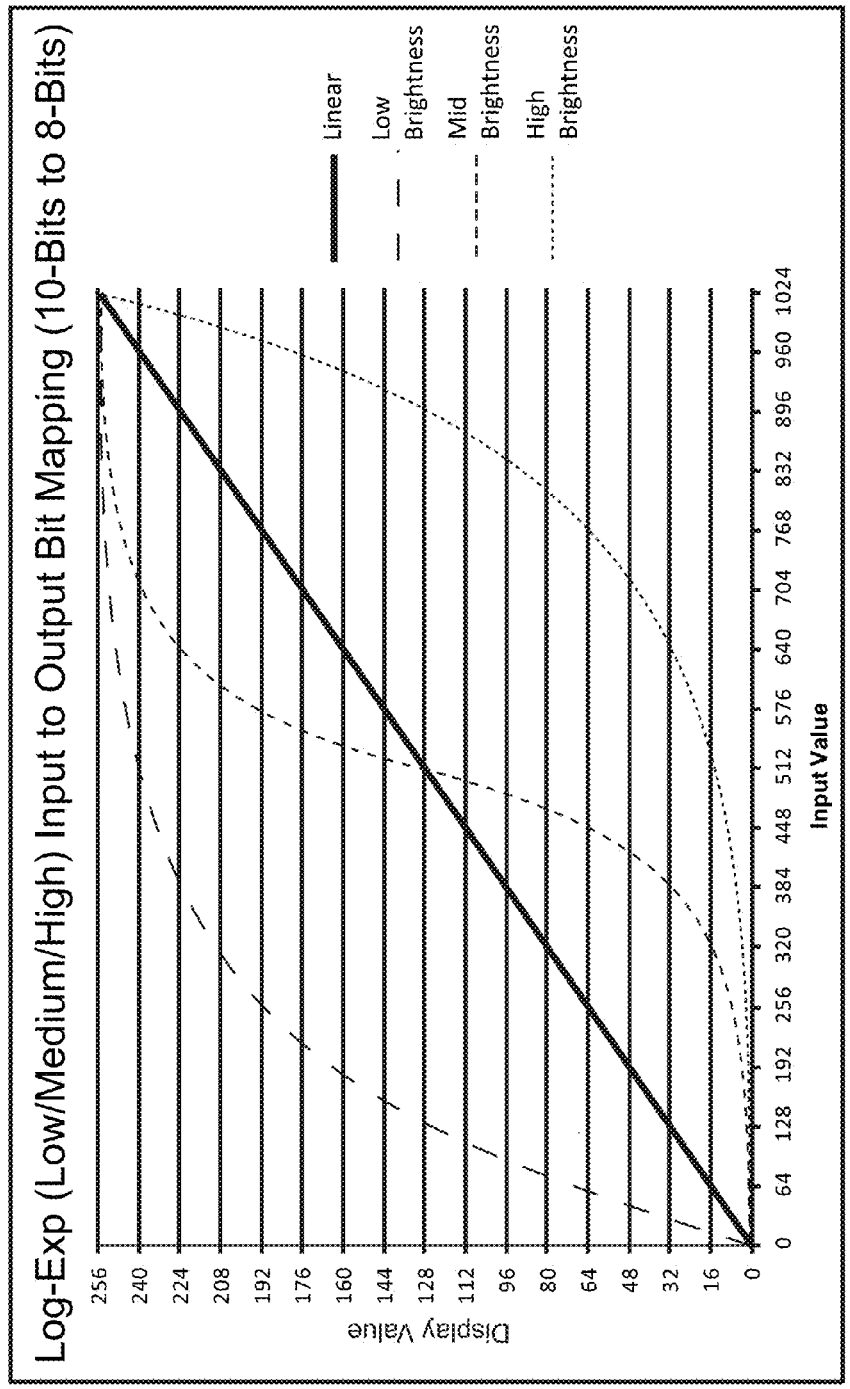
FIG. 16 is a schematic diagram of a triple-mapping mode (high, mid and low) Log-Exp function graph of the present invention.

Now referring to FIG. 16, there is shown a triple Log-Exp mode for mapping a 10-bit input to an 8-bit display, which has three discrete aspects as well as the single linearly mapped aspect. The third, or middle, line is the mid Log-Exp equation which is a two-part piecewise linear combination of the low and high curves of FIG. 14, with appropriate scales and offsets. The upper portion of the middle line is a graph of the following equation:

$$y = 2^{\hat{}}(N_y)[1 + 2b_y\{1 - 10^{\hat{}}(-ab_x(x - 2^{\hat{}}(N_x)/2))\}]/2 \text{ for } \{2^{\hat{}}(N_x)/2 \leq x \leq 2^{\hat{}}(N_x) - 1\}$$

Figure 17:
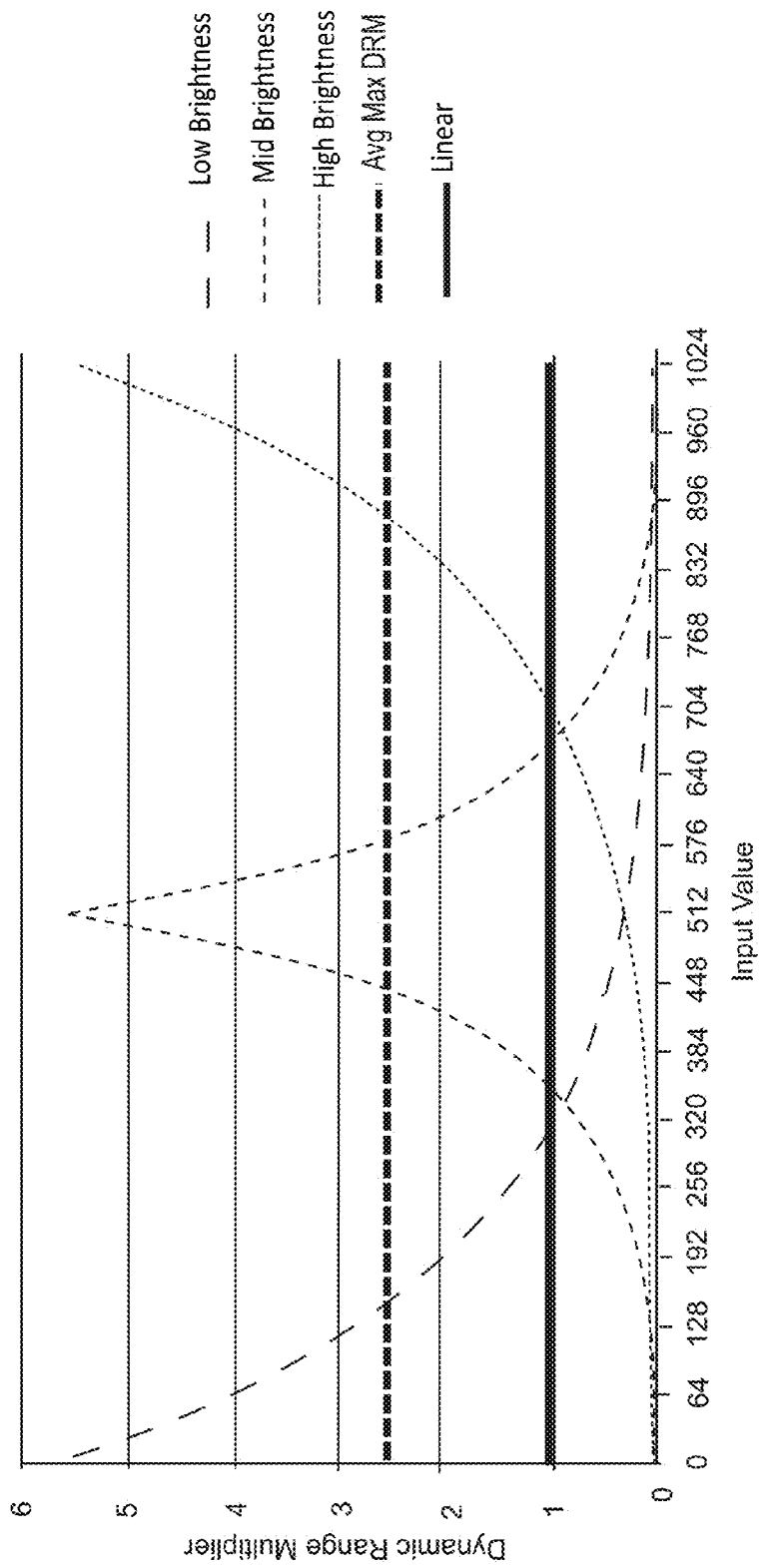
FIG. 17 is a Log-Exp based dynamic-range multiplier comparison to linear graph for the triple-mapping mode Log-Exp function of FIG. 12.

And the lower portion of the middle line is a graph of the following equation:

$$y = b_y[10^{\hat{}}(ab_x x) - 1]$$

for $\{0 \leq x \leq 2^{\hat{}}(N_x)/2 - 1\}$
Where:
$a = (\log_{10}(2^{\hat{}}N_y))/(2^{\hat{}}(N_x) - 1)$
$b_x = (2^{\hat{}}(N_x) - 1)/(2^{\hat{}}(N_x)/2 - 1)$
$b_y = (2^{\hat{}}(N_y)/2 - 1)/(2^{\hat{}}(N_y) - 1)$ Now referring to FIG. 17, there is shown a dynamic range multiplier comparison graph (similar in format to FIG. 15) to compare the dynamic range for Log-Exp bit mapping graphs to the dynamic range of a single linear mapped aspect of FIG. 16, where the dotted line is the DRM for the dotted line of FIG. 16, and the dashed line is the DRM for the dashed line of FIG. 16. The short dashed line is the DRM for the short dashed line of FIG. 16. The solid line at 1 represents the DRM (unity) of the linear mapping and the solid line at 2.53 is the line for the average max dynamic range for all three regions.

When the dual-mode gamma and 1/gamma methods are compared to the dual-mode Log-Exp methods, it become clear that the Log-Exp may be superior. Chart 1, below, shows the DRM above the linear line, and the max average DRM for each method. Also shown in the chart, is the product of the DRM and the max average DRM as a statistic indicating improvement over the standard linear mapping.

Chart 1

| Method Used | % of Curve with Max DRM > 1 | Average Max DRM | Product of % of Curve with Max DRM > 1 and Max Average |
|---|---|---|---|
| Gamma 2.2 | 72% | 1.53 | 1.10 |
| Gamma 3.0 | 62% | 1.68 | 1.04 |
| Gamma 6.0 | 42% | 1.88 | 0.79 |
| Gamma 8.0 | 35% | 1.92 | 0.67 |
| Log-Exp (Low, High) | 62% | 1.88 | 1.17 |
| Log-Exp (Low, Med, High) | 93% | 2.53 | 2.35 |

As shown in Chart 1, the Log-Exp has a higher % of curve with max DRM>1 for values of gamma below 3.0. However, for values of gamma <6.0, the Log-Exp has a superior average max DRM. As a result, the Log-Exp has aspects that exceed the gamma curve for all values of gamma. In addition, this is further illustrated by comparing the product of % of curve with max DRM>1 and average max DRM. The Log-Exp exceeds the gamma curves for all values of gamma.

In addition, if the Log-Exp curve with low, medium, and high regions is used, this curve outperforms the gamma curves for all values of gamma in all three characteristics.

The examples of the present invention are shown with a 10-Bit to 8-Bit mapping. It should be understood that the 12-Bit to 8-Bit, 14-Bit to 8-Bit and 16-Bit to 8-Bit, etc. combinations are also easily adaptable. Similarly, addition of more interstitial curves could be desired, and readily accomplished, following the teachings herein. Of course, the output is not limited to 8-bit outputs, and others could be substituted.

The application contemplates a selection to be made by the airborne operator. This could be accomplished in many ways, and is a matter of design choices. However, it should be understood that either a static or a sequenced scan of the various aspects could be utilized so that the operator does not need to make motor movement to see different data. Also it may be desirable to have sequence timing adjustment knob or other selection configuration to make adjustable the duration for each display of the different aspects. In certain situations, it may be desirable to make the sequencing so rapid that the operator's eyes and mind integrate the rapidly changing aspect displays, and thereby effectively create a 10-Bit perceived video image on an 8-Bit physical display device.

Figure 18:
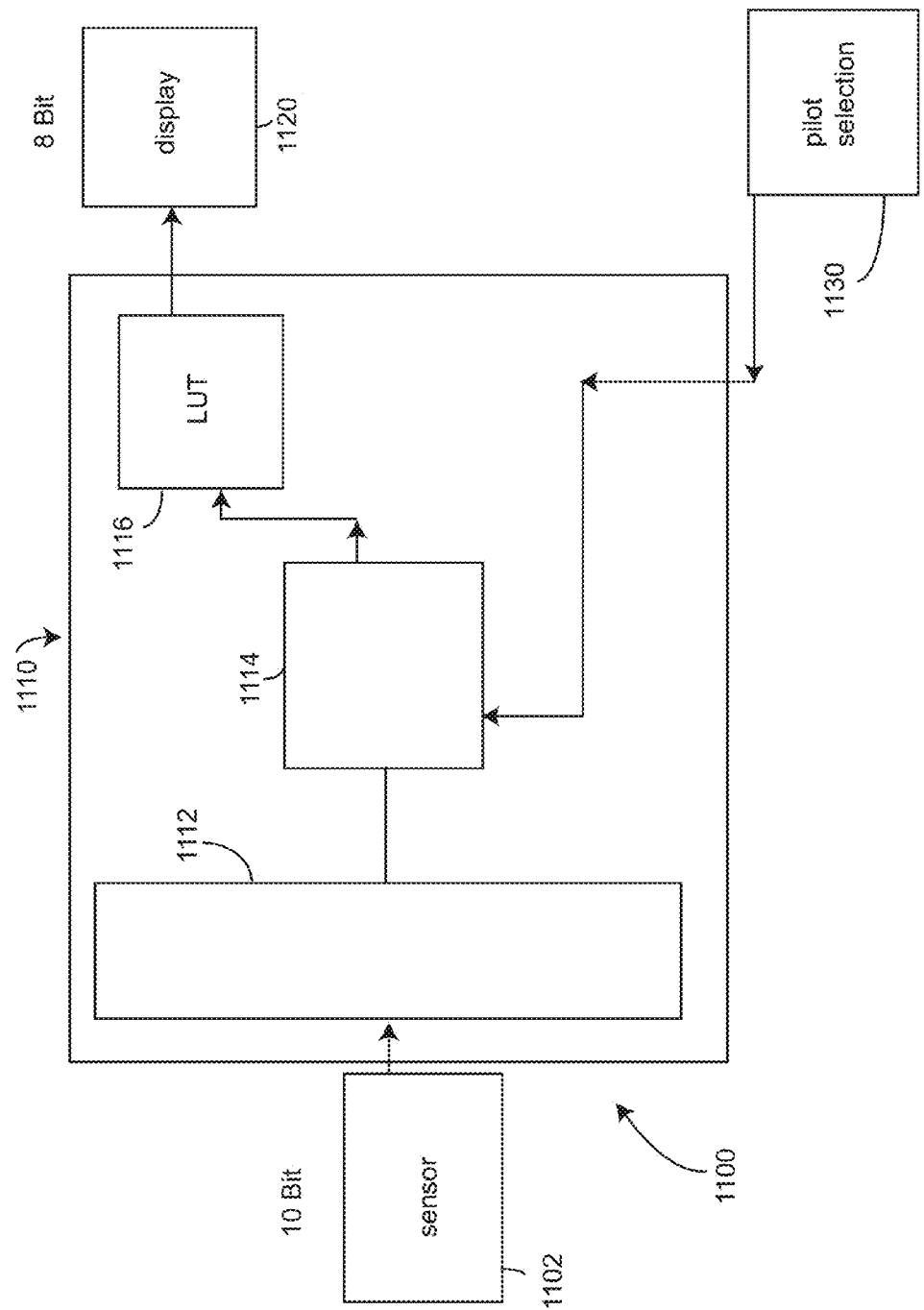
FIG. 18 is a simplified diagram of pilot display mapping mode selectable display system of the present invention.

Now referring to FIG. 18, there is shown a very simplified representative system, generally designated 1100, of the present invention, which could perform the method of the present invention.

A high dynamic range sensor 1102, which could be a 10-Bit or a high definition video camera, provides high dynamic range video to a display rendering system 1110, which could be a dedicated hardware system, or it could be a portion of, or application on, a more general purpose computing platform with specialized software configured to operate the computing platform to accomplish the mapping and display innovation described herein. The high-dynamic range video is provided to an input 1112, which could be memory which temporarily retains the video signal, as well as application-specific software configured to perform the mapping. Numerous other implementations could be substituted. Shown here is merely an example of such various structures. A microprocessor 1114 runs the mapping software of the present invention and accepts inputs from the pilot or airborne personnel selector 1130. Look-up table 1116 is populated with pre-calculated mapped relationships, in accordance with the mapping schemes of the present invention. This mapped image is then provided to the display 1120.

It is thought that the method and apparatus of the present invention will be understood from the foregoing description, and that it will be apparent that various changes may be made in the form, construction, steps, and arrangement of the parts and steps thereof, without departing from the spirit and scope of the invention or sacrificing all of their material advantages. The form herein-described is merely a preferred or exemplary embodiment thereof.

I claim:

1. A method of displaying high-dynamic range video images on a lower-dynamic range display on an aircraft comprising the steps of:
    providing a video signal with a first dynamic range; where the video signal is defined as x;
    providing a display device with a second dynamic range; where said first dynamic range is higher than said second dynamic range;
    providing a plurality of aspects of said video signal; where each of said plurality of aspects is a non-linear mapping of said video signal as x to y where x is located in the exponent; and non-simultaneously displaying of each of said plurality of aspects on said display device in response to a selection signal;

where a lower one of said plurality of aspects is defined by:

$$Y=2^{\wedge}(N_y)*(1-10^{\wedge}(-ax));$$

and a higher one of said plurality of aspects is defined by $$Y=10^{\wedge}(ax)-1$$

where:
$a=(\log_{10}(2^{\wedge}N_y))/(2^{\wedge}(N_x)-1)$
$N_x$=Number of bits in the Input (X-axis) [Max=$2^{\wedge}(N_x)$-1]
$N_y$=Number of bits in the Output (Y-axis) [Max=$2^{\wedge}(N_y)$-1].

2. The method of claim 1 wherein said selection signal is responsive to a selection of an aspect made by personnel on an aircraft, and said display device is located on said aircraft.

3. The method of claim 1 where a logarithmic constant is also part of the exponent which includes x.

4. The method of claim 1 where the personnel are located other than in an aircraft.

5. The method of claim 1 where a lower dynamic range is required to process an image content at a faster rate than would be possible if a higher dynamic range were utilized.

6. The method of claim 2 where y is expressed as $y=z^{ax}$.

7. The method of claim 6 where the a in $y=z^{ax}$ is a log expression based upon a number of bits in the video signal and a number of bits in the available to be displayed in the display device.

8. A method of displaying high-dynamic range video images on a lower-dynamic range display on an aircraft comprising the steps of:

providing a video signal with a first dynamic range; where the video signal is defined as x;

providing a display device with a second dynamic range; where said first dynamic range is higher than said second dynamic range;

providing a plurality of aspects of said video signal; where each of said plurality of aspects is a non-linear mapping of said video signal as x to y where x is located in the exponent; and non-simultaneously displaying of each of said plurality of aspects on said display device in response to a selection signal;

wherein said selection signal is responsive to a selection of an aspect made by personnel on an aircraft, and said display device is located on said aircraft;

where a lower one of said plurality of aspects is defined by:

$$Y=2^{\wedge}(N_y)*(1-10^{\wedge}(-ax));$$

and a higher one of said plurality of aspects is defined by $$Y=10^{\wedge}(ax)-1$$

where:
$a=(\log_{10}(2^{\wedge}N_y))/(2^{\wedge}(N_x)-1)$
$N_x$=Number of bits in the Input (X-axis) [Max=$2^{\wedge}(N_x)$-1]
$N_y$=Number of bits in the Output (Y-axis) [Max=$2^{\wedge}(N_y)$-1].

9. The method of claim 8 comprising an intermediate aspect between said lower and higher aspects.

10. The method of claim 9 wherein said intermediate aspect is bifurcated into an upper portion and a bottom portion defined as follows:

the upper portion is mapped with the following equation:

$$y=2^{\wedge}(N_y)[1+2b_y\{1-10^{\wedge}(-ab_x(x-2^{\wedge}(N_x)/2))\}]/2 \text{ for } \{2^{\wedge}(N_x)/2 \le x \le 2^{\wedge}(N_x)-1\}$$

and the bottom portion of the intermediate aspect is mapped with the following equation:

$$y=b_y[10^{\wedge}(ab_xx)-1]$$

for $\{0)(2^{\wedge}(N_x)/2-1\}$
where:
$a=(\log_{10}(2^{\wedge}N_y))/(2^{\wedge}(N_x)-1)$
$b_x=(2^{\wedge}(N_x)-1)/(2^{\wedge}(N_x)/2-1)$
$b_y=(2^{\wedge}(N_y)/2-1)/(2^{\wedge}(N_y)-1)$.

11. A method of claim 1 where the selection signal is an automatically repeating selection signal configured for sequencing through each of said plurality of aspects.

12. The method of claim 11 where the sequencing is so rapid that an operator's eyes and mind integrate the rapidly changing aspect displays and thereby effectively create a 10-Bit perceived video image on an 8-Bit physical display device.

13. The method of claim 1 where the first dynamic range is 10-Bits per pixel and the second dynamic range display is an 8-Bits per pixel display.

14. A system for displaying high dynamic range video images on a lower dynamic range display on an aircraft comprising:

means for providing a video signal with a first dynamic range; where the video signal is defined as x;

a display device with a second dynamic range; where said first dynamic range is higher than second dynamic range;

means for providing a plurality of aspects of said video signal; where each of said plurality of aspects is a non-linear mapping of said video signal as x to y where x is located in an exponent in an equation where y is expressed in relation to x; and means for providing a selection signal for non-simultaneously displaying each of said plurality of aspects on said display device in response to said selection signal;

where a first one of said plurality of aspects is defined by:

$$Y=2^{\wedge}(N_y)*(1-10^{\wedge}(-ax));$$

and a second one of said plurality of aspects is defined by $$Y=10^{\wedge}(ax)-1$$

where:
$a=(\log_{10}(2^{\wedge}N_y)/(2^{\wedge}(N_x)-1)$
$N_x$=Number of bits in the Input (X-axis) [Max=$2^{\wedge}(N_x)$-1]
$N_y$=Number of bits in the Output (Y-axis) [Max=$2^{\wedge}(N_y)$-1].

15. The system of claim 14 wherein said means for providing a plurality of aspects comprises a microprocessor and a Look-up Table (LUT).

16. The system of claim 15 wherein the microprocessor is a dedicated hardware microcontroller.

17. The system of claim 15 wherein the microprocessor function is performed by a general purpose microprocessor, which performs numerous operations unrelated to mapping display data.

18. The system of claim 15 wherein said means for providing a selection signal takes a single input from an operator and generates a plurality of commands to said microprocessor.

* * * * *